(12) United States Patent
Chen et al.

(10) Patent No.: US 11,229,030 B2
(45) Date of Patent: Jan. 18, 2022

(54) METHOD FOR TRANSMITTING UPLINK SIGNAL, TERMINAL AND NETWORK DEVICE

(71) Applicant: GUANGDONG OPPO MOBILE TELECOMMUNICATIONS CORP., LTD., Guangdong (CN)

(72) Inventors: Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 5 days.

(21) Appl. No.: 16/617,328

(22) PCT Filed: May 26, 2017

(86) PCT No.: PCT/CN2017/086097
§ 371 (c)(1),
(2) Date: Nov. 26, 2019

(87) PCT Pub. No.: WO2018/214149
PCT Pub. Date: Nov. 29, 2018

(65) Prior Publication Data
US 2020/0374883 A1 Nov. 26, 2020

(51) Int. Cl.
*H04W 72/04* (2009.01)
*H04W 76/27* (2018.01)
(Continued)

(52) U.S. Cl.
CPC ....... *H04W 72/0493* (2013.01); *H04L 1/0013* (2013.01); *H04L 5/0048* (2013.01);
(Continued)

(58) Field of Classification Search
CPC ... H04L 1/0013; H04L 5/0048; H04L 5/0098; H04L 5/10; H04L 25/0226;
(Continued)

(56) References Cited

U.S. PATENT DOCUMENTS 9,166,729 B2 * 10/2015 Gomadam ............... H04K 1/02
10,727,996 B2 * 7/2020 Nam ..................... H04L 5/0007
(Continued)

FOREIGN PATENT DOCUMENTS

| CN | 102547872 | 7/2012 |
|---|---|---|
| CN | 102665230 | 9/2012 |

(Continued)

OTHER PUBLICATIONS

EPO, Office Action for EP Application No. 17911108.3, dated Apr. 29, 2020.
(Continued)

*Primary Examiner* — Eric Nowlin
(74) *Attorney, Agent, or Firm* — Hodgson Russ LLP

(57) ABSTRACT

The present invention provides a method for transmitting an uplink signal, a terminal, and a network device. In one aspect, in embodiments of the present invention, by receiving configuration information of a zero-power uplink reference signal transmitted by a network device, and determining resources occupied by the zero-power uplink reference signal according to the configuration information, no uplink data is transmitted over the resources, and/or no non-zero-power uplink reference signal is transmitted over the resources. Since resources are pre-reserved on a terminal, the interference with uplink reference signals transmitted by other terminals over pre-reserved resources caused by uplink signals transmitted by the terminal over the pre-reserved resources is effectively avoided, and reliable transmission of the uplink reference signals of the terminal can be ensured,
(Continued)

thereby improving the transmission performance of these uplink reference signals.

13 Claims, 4 Drawing Sheets

(51) Int. Cl.
| | |
|---|---|
| H04L 1/00 | (2006.01) |
| H04L 5/00 | (2006.01) |
| H04L 5/10 | (2006.01) |
| H04L 25/02 | (2006.01) |
| H04W 80/02 | (2009.01) |

(52) U.S. Cl.
CPC .............. *H04L 5/0098* (2013.01); *H04L 5/10* (2013.01); *H04L 25/0226* (2013.01); *H04W 72/042* (2013.01); *H04W 76/27* (2018.02); *H04W 80/02* (2013.01)

(58) Field of Classification Search
CPC ........... H04W 72/042; H04W 72/0493; H04W 76/27; H04W 80/02
See application file for complete search history.

(56) References Cited

U.S. PATENT DOCUMENTS

| | | | | |
|---|---|---|---|---|
| 11,038,647 | B2 * | 6/2021 | Enescu | H04W 24/10 |
| 2013/0155921 | A1 * | 6/2013 | Gomadam | H04L 25/0226 370/310 |
| 2014/0126404 | A1 | 5/2014 | Kim et al. | |
| 2015/0326363 | A1 | 11/2015 | Yoon et al. | |
| 2016/0007323 | A1 | 1/2016 | Suzuki et al. | |
| 2016/0087709 | A1 * | 3/2016 | Horiuchi | H04B 7/068 375/260 |
| 2016/0242156 | A1 | 8/2016 | Kim et al. | |
| 2016/0294527 | A1 | 10/2016 | Yoon et al. | |
| 2016/0329998 | A1 | 11/2016 | Li | |
| 2017/0257177 | A1 | 9/2017 | Noh et al. | |
| 2018/0254864 | A1 * | 9/2018 | Bontu | H04B 7/0417 |
| 2018/0359069 | A1 * | 12/2018 | Nam | H04L 5/0048 |
| 2019/0229873 | A1 * | 7/2019 | Enescu | H04L 5/0053 |
| 2020/0213050 | A1 * | 7/2020 | Chen | H04L 5/0048 |
| 2020/0382181 | A1 * | 12/2020 | Wang | H04B 7/0465 |
| 2020/0389270 | A1 * | 12/2020 | Lee | H04L 5/0053 |

FOREIGN PATENT DOCUMENTS

| | | | | |
|---|---|---|---|---|
| CN | 106102174 | | 11/2016 | |
| CN | 106416404 | | 2/2017 | |
| CN | 106465354 | A * | 2/2017 | ............ H04W 72/04 |
| CN | 108737059 | A * | 11/2018 | ............ H04W 72/04 |
| CN | 108809607 | A * | 11/2018 | ............ H04W 72/04 |
| CN | 108809607 | B * | 7/2019 | ............ H04W 72/04 |
| CN | 108737059 | B * | 11/2019 | ............ H04W 72/04 |
| CN | 106465354 | B * | 7/2020 | ............ H04W 72/04 |
| CN | 111800247 | A * | 10/2020 | ............ H04W 72/04 |
| EP | 3094129 | | 11/2016 | |
| JP | 2016502793 | | 1/2016 | |
| KR | 20150044889 | | 4/2015 | |
| RU | 2494573 | C2 | 9/2013 | |
| RU | 2502191 | C1 | 12/2013 | |
| RU | 2536345 | C2 | 12/2014 | |
| WO | 2013044754 | | 4/2013 | |
| WO | WO-2015180098 | A1 * | 12/2015 | ............ H04W 72/04 |
| WO | 2016021969 | | 2/2016 | |
| WO | 2016060466 | | 4/2016 | |
| WO | 2017017564 | | 2/2017 | |
| WO | 2017033778 | | 3/2017 | |

OTHER PUBLICATIONS

Huawei et al., "Consideration on interference measurement for downlink CSI acquisition," 3GPP TSG RAN WG1 Meeting #88, R1-1701680, Feb. 2017, 6 pages.
LG Electronics, "On SRS design and related operations," 3GPP TSG RAN WG1 Meeting #89, R1-1707618, May 2017, 6 pages.
ZTE, "Discussion on SRS design for NR," 3GPP TSG RAN WG1 Meeting #89, R1-1707133, May 2017, 3 pages.
Federal Service For Intellectual Property in Russia, Office Action for RU2019139254, dated Aug. 26, 2020.
SIPO, First Office Action for CN 201911316699.1, dated Nov. 3, 2020.
Huawei, HiSilicon, "UL SRS design for CSI acquisition and beam management", 3GPP TSG RAN WGl Meeting #88, R1-1701699, 8 pages, Feb. 13, 2017, Greece.
WIPO, ISR for PCT/CN2017/086097, Feb. 26, 2018.
EPO, Communication for EP Application No. 17911108.3, dated Feb. 2, 2021.
ISDEC, Office Action for CA Application No. 3064151, dated Jan. 18, 2021.
JPO, Office Action for JP Application No. 2019-564159, dated Mar. 19, 2021.
IPOS, Office Action for SG Application No. 11201910853V, dated Mar. 29, 2021.
"3rd Generation Partnership Project; Technical Specification Group Radio Access Network; Evolved Universal Terrestrial Radio Access (E-UTRA); Physical channels and modulation (Release 12)," 3GPP TS 36.211, Mar. 2014, v12.1.0, 120 pages.
INAPI, Office Action for CL Application No. 201903321, dated May 20, 2021.
EPO, Communication for EP Application No. 17911108.3, dated Jul. 1, 2021.
IPI, Office Action for IN Application No. 201917050627, dated May 13, 2021.
JPO, Office Action for JP Application No. 2019-564159, dated Jul. 13, 2021.
CIPO, Office Action for CA Application No. 3064151, dated Nov. 5, 2021.
KIPO, Office Action for KR Application No. 10-2019-7034088, dated Aug. 31, 2021.
TIPO, First Office Action for TW Application No. 107114992, dated Aug. 31, 2021.

* cited by examiner

METHOD FOR TRANSMITTING UPLINK SIGNAL, TERMINAL AND NETWORK DEVICE

CROSS-REFERENCE TO RELATED APPLICATIONS

This application is a U.S. national phase application of International Application No. PCT/CN2017/086097, filed on May 26, 2017, the entire disclosure of which is incorporated herein by reference.

TECHNICAL FIELD

The present disclosure relates to a wireless access technology, and more particularly, to a method, a terminal and a network device for transmitting an uplink signal.

BACKGROUND

In a new radio (NR) system, a terminal sometimes transmits an upstream reference signal, such as a Sounding Reference Signal (SRS), a Demodulation Reference Signal (DMRS), or a Phase Tracking Reference Signal (PTRS) and the like.
In order to reduce interference with transmission of these uplink reference signals to ensure reliable transmission of these uplink reference signals of a terminal, it is desirable to provide a method for transmitting an uplink signal.

SUMMARY

Multiple aspects of the present disclosure provide a method, a terminal and a network device for transmitting an uplink signal.
A method for transmitting an uplink signal is provided in one aspect of the present disclosure, comprising:
receiving configuration information, sent by a network device, of a zero-power uplink reference signal;
determining a resource occupied by the zero-power uplink reference signal based on the configuration information;
performing that uplink data is not sent on the resource; and/or, performing that non-zero-power uplink reference signal is not sent on the resource.
Another method for transmitting an uplink signal is provided in another aspect of the present disclosure, comprising:
obtaining configuration information of a zero-power uplink reference signal based on a resource occupied by the zero-power uplink reference signal;
sending the configuration information to a terminal;
receiving no uplink data on the resource; and/or, receiving no non-zero-power uplink reference signal on the resource.
A terminal is provided in another aspect of the present disclosure, comprising:
a receiving unit, configured to receive configuration information, sent by a network device, of a zero-power uplink reference signal;
a determining unit, configured to determine a resource occupied by the zero-power uplink reference signal based on the configuration information;
a performing unit, configured to perform that the uplink data is not sent on the resource; and/or, perform that the no non-zero-power uplink reference signal is not sent on the resource.
A network device is provided in another aspect of the present disclosure, comprising:

an obtaining unit, configured to obtain configuration information of a zero-power uplink reference signal based on a resource occupied by the zero-power uplink reference signal;
a sending unit, configured to send the configuration information to a terminal;
a performing unit, configured to receive no uplink data on the resource; and/or, receive no non-zero-power uplink reference signal on the resource.

BRIEF DESCRIPTION OF THE DRAWINGS

Accompanying drawings used to describe embodiments or the prior art will be introduced briefly below in order to illustrate the technical solutions in embodiments of the present disclosure more clearly. Obviously, the accompanying drawings in the following description are for some embodiments of the present disclosure, and other drawings can also be obtained based on these accompanying drawings by a person having ordinary skill in the art without creative efforts.

DETAILED DESCRIPTION

Figure 1:
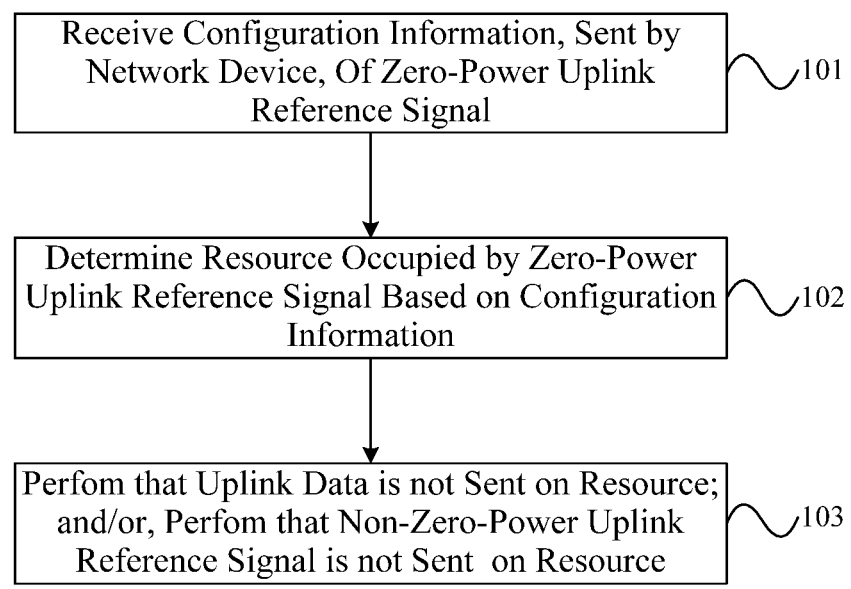
FIG. 1 is a flow chart of a method for transmitting an uplink signal according to an embodiment of the present disclosure.

The technical solutions in embodiments of the present disclosure will be clearly and completely described with reference to the drawings in embodiments of the present disclosure. Obviously, described embodiments are part of embodiments of the present disclosure, and not all of the embodiments. All other embodiments obtained by those skilled in the art based on embodiments of the present disclosure without creative efforts are within the scope of the present disclosure.
It should be noted that a non-zero-power uplink reference signal is an uplink reference signal that a terminal actually needs to send. If an uplink reference signal is not a zero-power uplink reference signal, it may be considered as a non-zero-power uplink reference signal by default, and a so-called uplink reference signal is the non-zero-power uplink reference signal referred to in this application.
In addition, the term "and/or" herein only describes an association relationship between associated objects and indicates that there may be three relationships. For example, A and/or B may indicate that there are three cases where A exists separately, A and B exist at the same time, and B exists separately. In addition, the character "/" herein generally indicates that an "or" relationship exists between associated objects.
FIG. 1 is a flow chart of a method for transmitting an uplink signal according to an embodiment of the present disclosure, as shown in FIG. 1.
101. Receive configuration information, sent by a network device, of a zero-power uplink reference signal (ZP ULRS).
102. Determine a resource occupied by the ZP ULRS based on the configuration information.

103. Perform that the uplink data is not sent on the resource; and/or, perform that non-zero-power uplink reference signal (NZP ULRS) is not sent on the resource.

In 103, that perform that the uplink data is not sent on the resource may be: perform rate matching or puncture processing on uplink data on the resource.

It should be noted that a performing entity of 101~103 may be a terminal.

The main idea of this embodiment is to activate a zero-power uplink reference signal by configuration of a network device and indicating to a terminal. When some terminals send an uplink reference signal (that is, a non-zero-power uplink reference signal), other terminals may be simultaneously indicated to perform a resource idle on a corresponding resource, thereby avoiding interference of the uplink reference signals transmitted by other terminals, and improving transmission performance of these uplink reference signals.

Therefore, by receiving configuration information of a zero-power uplink reference signal sent by a network device, a resource occupied by the zero-power uplink reference signal is further determined based on the configuration information, so that no uplink data is sent on the resource, and/or no non-zero-power uplink reference signal is sent on the resource. Because the terminal performs a resource reservation, it effectively avoids that an uplink signal transmitted by the terminal on the reserved resource has interference with an uplink reference signal transmitted by other terminal on the reserved resource, so that reliable transmission of the uplink reference signal of the terminal can be ensured, thereby improving transmission performance of these uplink reference signals.

Optionally, in a possible implementation manner of this embodiment, the ZP ULRS may comprise, but is not limited to, an existing ULRS such as a ZP SRS, a ZP DMRS, or a ZP PTRS, or other ZP that may also be newly defined by a NR system, which is not particularly limited in this embodiment.

Optionally, in a possible implementation manner of this embodiment, the NZP ULRS may comprise, but is not limited to, a NZP SRS, a NZP DMRS, or a NZP PTRS, or other NZP ULRS that may also be newly defined by a NR system, which is not particularly limited in this embodiment.

Optionally, in a possible implementation manner of this embodiment, in 101, it may be that receive configuration information of a ZP ULRS sent by a network device through high-layer signaling or Downlink Control Information (DCI).

A terminal may receive configuration information of a ZP ULRS sent by a network device by using high-layer signaling or DCI.

For example, the high-layer signaling may be a radio resource control (RRC) message, and configuration information of the ZP ULRS may be carried by an information element (IE) in a RRC message. The RRC message may be a RRC message in the prior art, such as a RRC CONNECTION RECONFIGURATION message, which is not limited in this embodiment. The configuration information of the ZP ULRS is carried by an existing RRC message with an extensional IE, or the RRC message may also be a RRC message different from that existing in the prior art.

For example, the high-layer signaling may be a Media Access Control (MAC) Control Element (CE) message, and the configuration information of the ZP ULRS may be carried by adding a new MAC CE message.

Optionally, in one possible implementation manner of this embodiment, in 101, the received configuration information may comprise, but is not limited to, resource configuration information and activation information, which is not limited in this embodiment.

In this embodiment, the resource configuration information and the activation information may be two pieces of independent information or may be one piece of information, which is not limited in this embodiment.

For example, the terminal may receive the resource configuration information of the ZP ULRS sent by the network device through the RRC message.

Alternatively, for example, the terminal may receive the activation information of the ZP ULRS sent by the network device through the DCI or MAC CE message.

The resource configuration information indicates a resource configured for the ZP ULRS.

In this embodiment, the resource may comprise, but is not limited to, at least one of a time domain resource, a frequency domain resource, and a sequence resource, which is not limited in this embodiment.

For example, the time domain resource may be a time slot in which the ZP ULRS is located or an Orthogonal Frequency Division Multiple (OFDM) symbol.

Or, for example, the frequency domain resource may be a subcarrier or a physical resource block (RB) occupied by the ZP ULRS.

The sequence resource may be a cycle shift, an Orthogonal Cover Code (OCC) or a sequence Identity (ID) used by the ZP ULRS.

In this embodiment, the resource configured for the ZP ULRS may be multiplexed with a resource configured for a corresponding NZP ULRS.

For example, the network device may configure same N resources (N is an integer greater than or equal to 1) shared by the NZP ULRS and the ZP ULRS, and then indicate which resource is occupied by the ZP ULRS through the activation information.

The activation information indicates whether to activate the ZP ULRS, that is, to indicate whether the ZP ULRS is valid. The 'activation' may also be referred to as triggering, and may also be referred to as enabling, which is not limited in this embodiment.

The activation information may be represented by 1-bit information. For example, 1 may indicate an activated state; and 0 may indicate an inactivated state.

In a specific implementation process, in 101, it may be that receive DCI sent by the network device, wherein the DCI comprises an aperiodic triggering signaling of the ZP SRS, which is used to trigger the ZP SRS. The aperiodic triggering signaling of the ZP SRS may be used as the activation information.

In this implementation manner, when one terminal A is triggered to send a NZP SRS, if uplink transmission of another terminal B multiplexes a same resource with the NZP SRS, the terminal B may be triggered a ZP SRS corresponding to the NZP SRS by a aperiodic triggering signaling of a ZP SRS, so that no uplink signal is sent on the resource occupied by the NZP SRS, and interference with the NZP SRS can be avoided.

In another specific implementation process, in 101, it may be that receive DCI sent by the network device for scheduling uplink transmission, wherein the DCI comprises the activation information which is used to activate a ZP DMRS or a ZP PTRS in a physical resource region that carries the uplink transmission.

The uplink transmission may be uplink data transmission, or may also be reported as uplink channel state information (CSI), which is not limited in this embodiment.

For example, a terminal and a network device may pre-arrange, or the network device configures a physical resource or a DMRS port used by a ZP DMRS. When the terminal receives DCI for scheduling uplink transmission, it needs to perform the uplink transmission in a time slot. So the ZP DMRS may be activated in the time slot, that is, no uplink data, uplink CSI, or DMRS is sent on the physical resource corresponding to the ZP DMRS in the time slot or the DMRS port of the ZP DMRS.

In this way, when a terminal and other terminal perform Multi-User Multiple-Input Multiple-Output (MU-MIMO) transmission, if two terminals use different DMRS ports and different ports occupy different physical resources, a terminal may not send uplink signal on a physical resource, where a multiplexing terminal sends a DMRS, to reduce interference with the multiplexing terminal.

Or, for example, a terminal and a network device may pre-arrange, or the network device configures a physical resource or a PTRS port used by a ZP PTRS. When the terminal receives DCI for scheduling uplink transmission, it needs to perform the uplink transmission in a time slot. So the ZP PTRS may be activated in the time slot, that is, no uplink data, uplink CSI, or DMRS is sent on the physical resource corresponding to the ZP PTRS in the time slot or the PTRS port of the ZP PTRS.

In this way, when a terminal and other terminal perform MU-MIMO transmission, if two terminals use different PTRS ports and different ports occupy different physical resources, a terminal may not send uplink signal on a physical resource, where a multiplexing terminal sends a PTRS, to reduce interference with the multiplexing terminal.

Further, in this implementation, the activation information may further indicate that the activated uplink reference signal is a ZP ULRS or a NZP ULRS.

The activation information may be represented by 2-bit information. For example, 00 may indicate an activated state; 01 may indicate that the activated uplink reference signal is a NZP ULRS; 10 may indicate that the activated uplink reference signal is a ZP ULRS; and 11 is temporarily not used.

For example, if the activated uplink reference signal is a NZP ULRS, the terminal needs to send the NZP ULRS on a corresponding resource; if the activated uplink reference signal is a ZP ULRS, the terminal does not need to send an uplink reference signal on a corresponding resource and need to reserve a corresponding resource. In this way, whether a terminal sends a NZP ULRS or needs to reserve a resource of a resource corresponding to a NZP ULRS sent by other terminal, it may be indicated by a same signaling, thereby simplifying signaling design.

Further, in this implementation, the activation information may further indicate to select a resource occupied by the activated zero-power uplink reference signal in the plurality of resources configured for the ZP ULRS indicated by the resource configuration information.

The network device may pre-configure a plurality of resources occupied by the ZP ULRS. Correspondingly, the activation information may select at least one resource occupied by the ZP ULRS from a plurality of resources occupied by the ZP ULRS configured by the network device. For example, it may be indicated in a manner of an index or a bitmap.

Further, in this implementation, the activation information may further indicate an antenna port occupied by the activated zero-power uplink reference signal.

For example, if the activated ZP ULRS is a ZP DMRS or a ZP PTRS, the activation information may indicate a DMRS port occupied by the ZP DMRS or a PTRS port occupied by the ZP PTRS, indicating that other terminal sends a DMRS port or a PTRS port occupied by transmission on the same resource.

Optionally, in a possible implementation manner of this embodiment, in 102, if the ZP ULRS is not activated, the ZP ULRS does not need to occupy a resource, that is, the resource occupied by the ZP ULRS is idle; if the ZP ULRS is activated, the resource occupied by the ZP ULRS may be determined based on configuration information of the ZP ULRS.

In the present disclosure, the ZP ULRS and the NZP ULRS are a same type of uplink reference signal, or are different types of uplink reference signal, which is not limited in this embodiment.

For example, a DMRS and/or a PTRS may not be sent on the resource occupied by the ZP DMRS.

Alternatively, for example, a DMRS and/or a SRS may not be sent on the resource occupied by the ZP PTRS.

The provided method for transmitting an uplink signal according to the present disclosure may be used to enable other terminal to flexibly perform resource idle on a corresponding resource when other terminal sends an uplink reference signal, thereby avoiding interference of an uplink signal sent by other terminal on these uplink reference signals. So reliable transmission of the uplink reference signal of the terminal can be ensured, thereby improving transmission performance of these uplink reference signals.

In this embodiment, by receiving configuration information of a zero-power uplink reference signal sent by a network device, a resource occupied by the zero-power uplink reference signal is further determined based on the configuration information, so that no uplink data is sent on the resource, and/or no non-zero-power uplink reference signal is sent on the resource. Because the terminal performs a resource reservation, it effectively avoids that an uplink signal transmitted by the terminal on the reserved resource has interference with an uplink reference signal transmitted by other terminal on the reserved resource, so that reliable transmission of the uplink reference signal of the terminal can be ensured, thereby improving transmission performance of these uplink reference signals.

Figure 2:
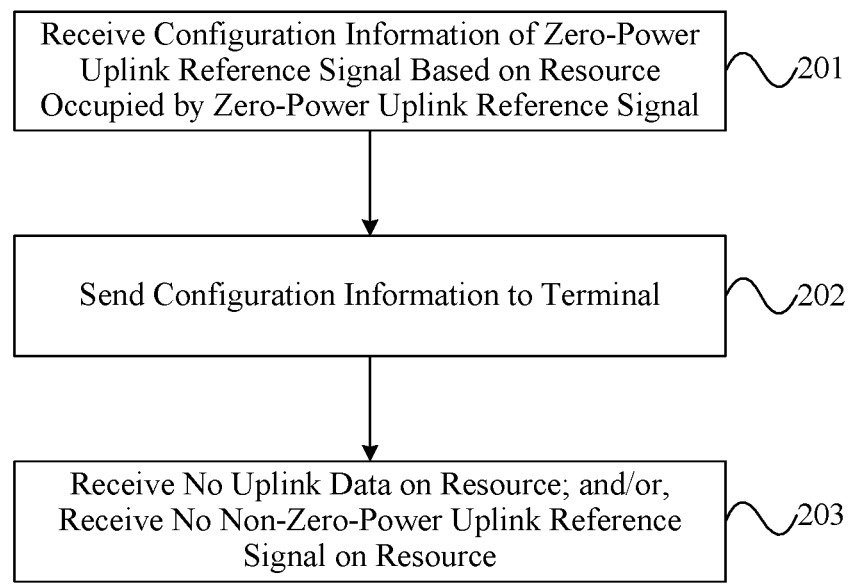
FIG. 2 is a flow chart of another method for transmitting an uplink signal according to another embodiment of the present disclosure.

FIG. 2 is a flow chart of another method for transmitting an uplink signal according to another embodiment of the present disclosure, as shown in FIG. 2.

201. Receive configuration information of a zero-power uplink reference signal (ZP ULRS) based on a resource occupied by the zero-power uplink reference signal.

202. Send the configuration information to a terminal.

203. Receive no uplink data on the resource; and/or, receive no non-zero-power uplink reference signal (NZP ULRS) on the resource.

In 203, the receiving no uplink data on the resource may be: perform rate matching or puncture processing on uplink data on the resource.

It should be noted that a performing entity of 201~203 may be a network device.

The main idea of this embodiment is to activate a zero-power uplink reference signal by configuration of a network device and indicating to a terminal. When some terminals send an uplink reference signal (that is, a non-zero-power uplink reference signal), other terminals may be simultaneously indicated to perform a resource idle on a corresponding resource, thereby avoiding interference of the uplink reference signals transmitted by other terminals, and improving transmission performance of these uplink reference signals.

In this way, by obtaining configuration information of a zero-power uplink reference signal based on a resource occupied by the zero-power uplink reference signal, the configuration information is further sent to a terminal, so that no uplink data is received on the resource, and/or no non-zero-power uplink reference signal is received on the resource. Because the terminal performs a resource reservation, it effectively avoids that an uplink signal transmitted by the terminal on the reserved resource has interference with an uplink reference signal transmitted by other terminal on the reserved resource, so that reliable transmission of the uplink reference signal of the terminal can be ensured, thereby improving transmission performance of these uplink reference signals.

Optionally, in a possible implementation manner of this embodiment, the ZP ULRS may comprise, but is not limited to, an existing ULRS such as a ZP SRS, a ZP DMRS, or a ZP PTRS, or other ZP that may also be newly defined by a NR system, which is not particularly limited in this embodiment.

Optionally, in a possible implementation manner of this embodiment, the NZP ULRS may comprise, but is not limited to, a NZP SRS, a NZP DMRS, or a NZP PTRS, or other NZP ULRS that may also be newly defined by a NR system, which is not particularly limited in this embodiment.

Optionally, in a possible implementation manner of this embodiment, in 202, it may be that send configuration information of a ZP ULRS to a terminal through high-layer signaling or Downlink Control Information (DCI).

For example, the high-layer signaling may be a radio resource control (RRC) message, and configuration information of the ZP ULRS may be carried by an information element (IE) in a RRC message, wherein the RRC message may be a RRC message in the prior art, such as a RRC CONNECTION RECONFIGURATION message, which is not limited in this embodiment. The configuration information of the ZP ULRS is carried by an existing RRC message with an extensional IE, or the RRC message may also be a RRC message different from that existing in the prior art.

For example, the high-layer signaling may be a Media Access Control (MAC) Control Element (CE) message, and the configuration information of the ZP ULRS may be carried by adding a new MAC CE message.

Optionally, in one possible implementation manner of this embodiment, in 201, the obtained configuration information may comprise, but is not limited to, resource configuration information and activation information, which is not limited in this embodiment.

In this embodiment, the resource configuration information and the activation information may be two pieces of independent information or may be one piece of information, which is not limited in this embodiment.

For example, the network device may send the resource configuration information of the ZP ULRS to the terminal through a RRC message.

Alternatively, for example, the network device may send the activation information of the ZP ULRS to the terminal through DCI or a MAC CE message.

The resource configuration information indicates a resource configured for the ZP ULRS.

In this embodiment, the resource may comprise, but is not limited to, at least one of a time domain resource, a frequency domain resource, and a sequence resource, which is not limited in this embodiment.

For example, the time domain resource may be a time slot in which the ZP ULRS is located or an Orthogonal Frequency Division Multiple (OFDM) symbol.

Or, for example, the frequency domain resource may be a subcarrier or a physical resource block (RB) occupied by the ZP ULRS.

The sequence resource may be a cycle shift, an Orthogonal Cover Code (OCC) or a sequence Identity (ID) used by the ZP ULRS.

In this embodiment, the resource configured for the ZP ULRS may be multiplexed with a resource configured for a corresponding NZP ULRS.

For example, the network device may configure same N resources (N is an integer greater than or equal to 1) shared by the NZP ULRS and the ZP ULRS, and then indicate which resource is occupied by the ZP ULRS through the activation information.

The activation information indicates whether to activate the ZP ULRS. The 'activation' may also be referred to as triggering, and may also be referred to as enabling, which is not limited in this embodiment.

Specifically, the activation information may be represented by 1-bit information. For example, 1 may indicate an activated state; and 0 may indicate an inactivated state.

In a specific implementation process, in 202, it may be that send DCI to the terminal, wherein the DCI comprises an aperiodic triggering signaling of the ZP SRS, which is used to trigger the ZP SRS. The aperiodic triggering signaling of the ZP SRS may be used as the activation information.

In this implementation manner, when one terminal A is triggered to send a NZP SRS, if uplink transmission of another terminal B multiplexes a same resource with the NZP SRS, the terminal B may be triggered a ZP SRS corresponding to the NZP SRS by a aperiodic triggering signaling of a ZP SRS, so that no uplink signal is sent on the resource occupied by the NZP SRS, and interference with the NZP SRS can be avoided.

In another specific implementation process, in 202, it may be that send DCI for scheduling uplink transmission to the terminal, wherein the DCI comprises the activation information which is used to activate a ZP DMRS or a ZP PTRS in a physical resource region that carries the uplink transmission.

The uplink transmission may be uplink data transmission, or may also be reported as uplink channel state information (CSI), which is not limited in this embodiment.

For example, a terminal and a network device may pre-arrange, or the network device configures a physical resource or a DMRS port used by a ZP DMRS. When the terminal receives DCI for scheduling uplink transmission, it needs to perform the uplink transmission in a time slot. So the ZP DMRS may be activated in the time slot, that is, no uplink data, uplink CSI, or DMRS is sent on the physical resource corresponding to the ZP DMRS in the time slot or the DMRS port of the ZP DMRS.

In this way, when a terminal and other terminal perform Multi-User Multiple-Input Multiple-Output (MU-MIMO) transmission, if two terminals use different DMRS ports and different ports occupy different physical resources, a terminal may not send uplink signal on a physical resource, where a multiplexing terminal sends a DMRS, to reduce interference with the multiplexing terminal.

Or, for example, a terminal and a network device may pre-arrange, or the network device configures a physical resource or a PTRS port used by a ZP PTRS. When the terminal receives DCI for scheduling uplink transmission, it needs to perform the uplink transmission in a time slot. So the ZP PTRS may be activated in the time slot, that is, no uplink data, uplink CSI, or DMRS is sent on the physical resource corresponding to the ZP PTRS in the time slot or the PTRS port of the ZP PTRS.

In this way, when a terminal and other terminal perform MU-MIMO transmission, if two terminals use different PTRS ports and different ports occupy different physical resources, a terminal may not send uplink signal on a physical resource, where a multiplexing terminal sends a PTRS, to reduce interference with the multiplexing terminal.

Further, in this implementation, the activation information may further indicate that the activated uplink reference signal is a ZP ULRS or a NZP ULRS.

Specifically, the activation information may be represented by 2-bit information. For example, 00 may indicate an activated state; 01 may indicate that the activated uplink reference signal is a NZP ULRS; 10 may indicate that the activated uplink reference signal is a ZP ULRS; and 11 is temporarily not used.

For example, if the activated uplink reference signal is a NZP ULRS, the terminal needs to send the NZP ULRS on a corresponding resource; if the activated uplink reference signal is a ZP ULRS, the terminal does not need to send an uplink reference signal on a corresponding resource and need to reserve a corresponding resource. In this way, whether a terminal sends a NZP ULRS or needs to reserve a resource of a resource corresponding to a NZP ULRS sent by other terminal, it may be indicated by a same signaling, thereby simplifying signaling design.

Further, in this implementation, the activation information may further indicate to select a resource occupied by the activated zero-power uplink reference signal in the plurality of resources configured for the ZP ULRS indicated by the resource configuration information.

Specifically, the network device may pre-configure a plurality of resources occupied by the ZP ULRS. Correspondingly, the activation information may select at least one resource occupied by the ZP ULRS from a plurality of resources occupied by the ZP ULRS configured by the network device. For example, it may be indicated in a manner of an index or a bitmap.

Further, in this implementation, the activation information may further indicate an antenna port occupied by the activated zero-power uplink reference signal.

For example, if the activated ZP ULRS is a ZP DMRS or a ZP PTRS, the activation information may indicate a DMRS port occupied by the ZP DMRS or a PTRS port occupied by the ZP PTRS, indicating that other terminal sends a DMRS port or a PTRS port occupied by transmission on the same resource.

Optionally, in a possible implementation manner of this embodiment, if the ZP ULRS is not activated, the ZP ULRS does not need to occupy a resource, that is, the resource occupied by the ZP ULRS is idle; if the ZP ULRS is activated, the resource occupied by the ZP ULRS may be determined based on configuration information of the ZP ULRS.

In the present disclosure, the ZP ULRS and the NZP ULRS are a same type of uplink reference signal, or are different types of uplink reference signal, which is not limited in this embodiment.

For example, a DMRS and/or a PTRS may not be sent on the resource occupied by the ZP DMRS.

Alternatively, for example, a DMRS and/or a SRS may not be sent on the resource occupied by the ZP PTRS.

The provided method for transmitting an uplink signal according to the present disclosure may be used to enable other terminal to flexibly perform resource idle on a corresponding resource when other terminal sends an uplink reference signal, thereby avoiding interference of an uplink signal sent by other terminal on these uplink reference signals. So reliable transmission of the uplink reference signal of the terminal can be ensured, thereby improving transmission performance of these uplink reference signals.

In this embodiment, by obtaining configuration information of a zero-power uplink reference signal based on a resource occupied by the zero-power uplink reference signal, the configuration information is further sent to a terminal, so that no uplink data is received on the resource, and/or no non-zero-power uplink reference signal is received on the resource. Because the terminal performs a resource reservation, it effectively avoids that an uplink signal transmitted by the terminal on the reserved resource has interference with an uplink reference signal transmitted by other terminal on the reserved resource, so that reliable transmission of the uplink reference signal of the terminal can be ensured, thereby improving transmission performance of these uplink reference signals.

It should be noted that, according to the various method embodiments described above, for simple description, they are all expressed as a series of action combinations, but those skilled in the art should understand that the present disclosure is not limit by the described action sequence because certain steps may be performed in other sequences or concurrently in accordance with the present disclosure. In addition, those skilled in the art should also understand that the embodiments described in the specification are all preferred embodiments, and the actions and modules involved are not necessarily required by the present disclosure.

In the above embodiments, the descriptions of the various embodiments are focus on different parts, and the parts that are not detailed in an embodiment may be referred to the related descriptions of other embodiments.

Figure 3:
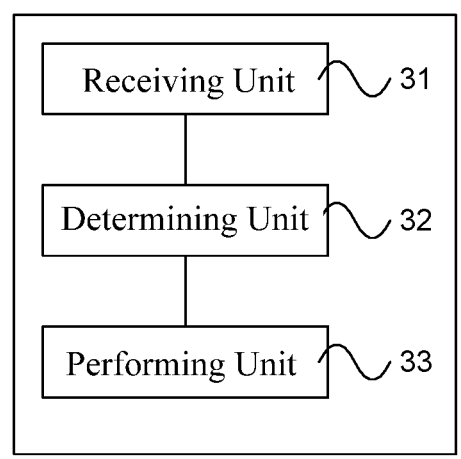
FIG. 3 is a block diagram of a terminal according to another embodiment of the present disclosure.

FIG. 3 is a block diagram of a terminal according to another embodiment of the present disclosure, as shown in FIG. 3. A terminal of this embodiment may comprise a receiving unit 31, a determining unit 32, and a performing unit 33. A receiving unit 31, configured to receive configuration information, sent by a network device, of a zero-power uplink reference signal; a determining unit 32, configured to determine a resource occupied by the zero-power uplink reference signal based on the configuration information; and a performing unit 33, configured to perform that the uplink data is not sent on the resource; and/or, perform that the non-zero-power uplink reference signal is not sent on the resource.

Optionally, in a possible implementation manner of the embodiment, the zero-power uplink reference signal may comprise, but is not limited to, a zero-power sounding reference signal, a zero-power demodulation reference signal, or a zero-power phase tracking reference signal, which is not limited in this embodiment.

Optionally, in a possible implementation manner of the embodiment, the non-zero-power uplink reference signal may comprise, but is not limited to, a non-zero-power sounding reference signal, a non-zero-power demodulation reference signal, or a non-zero-power phase tracking reference signal, which is not limited in this embodiment.

Optionally, in a possible implementation manner of the embodiment, the receiving unit 31 is configured to receive configuration information of the zero-power uplink reference signal sent by the network device through high-layer signaling or downlink control information.

Optionally, in a possible implementation manner of this embodiment, the high-layer signaling may comprise, but is not limited to, a radio resource control message or a media access control element message, which is not limited in this embodiment.

Optionally, in one possible implementation manner of this embodiment, the configuration information may comprise, but is not limited to, resource configuration information and activation information, which is not limited in this embodiment; wherein the resource configuration information indicates a resource configured for the zero-power uplink reference signal;

the activation information indicates whether to activate the zero-power uplink reference signal.

Specifically, the determining unit 32 may be configured to determine a resource occupied by the zero-power uplink reference signal based on the resource configuration information, when the activation information indicates to activate the zero-power uplink reference signal.

In this embodiment, the resource configured for the zero-power uplink reference signal may be multiplexed with a resource configured for a corresponding non-zero-power uplink reference signal.

In a specific implementation process, the receiving unit 31 may be configured to receive downlink control information sent by the network device, wherein the downlink control information comprises an aperiodic triggering signaling of a zero-power sounding reference signal which is used to trigger a zero-power sounding reference signal.

In another specific implementation process, the receiving unit 31 may be configured to receive downlink control information sent by the network device for scheduling uplink transmission, wherein the downlink control information comprises the activation information which is used to activate a zero-power demodulation reference signal or a zero-power phase tracking reference signal in a physical resource region that carries the uplink transmission.

In this implementation, the activation information may further be used to indicate that the activated uplink reference signal is a zero-power uplink reference signal or a non-zero-power uplink reference signal.

In this implementation, the activation information may further indicate to select a resource occupied by the activated zero-power uplink reference signal in the plurality of resources configured for the zero-power uplink reference signal indicated by the resource configuration information.

In this implementation, the activation information may further indicate an antenna port occupied by the activated zero-power uplink reference signal.

Optionally, in one possible implementation manner of this embodiment, the resource may comprise, but is not limited to, at least one of a time domain resource, a frequency domain resource, and a sequence resource, which is not limited in this embodiment.

Optionally, in one possible implementation manner of this embodiment, the performing unit 33 is configured to perform rate matching or puncturing processing on uplink data on the resource.

In the present disclosure, the zero-power uplink reference signal and the non-zero-power uplink reference signal are a same type of uplink reference signal, or are different types of uplink reference signal, which is not limited in this embodiment.

It should be noted that the method in the embodiments corresponding to FIG. 1 may be implemented by a terminal provided in this embodiment. For detailed description, refer to related content in embodiments corresponding to FIG. 1, which will not be described herein again.

In this embodiment, by the receiving unit receiving configuration information of a zero-power uplink reference signal sent by a network device, a resource occupied by the zero-power uplink reference signal is further determined based on the configuration information by the determining unit, so that no uplink data is sent by the performing unit on the resource, and/or no non-zero-power uplink reference signal is sent by the performing unit on the resource. Because the terminal performs a resource reservation, it effectively avoids that an uplink signal transmitted by the terminal on the reserved resource has interference with an uplink reference signal transmitted by other terminal on the reserved resource, so that reliable transmission of the uplink reference signal of the terminal can be ensured, thereby improving transmission performance of these uplink reference signals.

Figure 4:
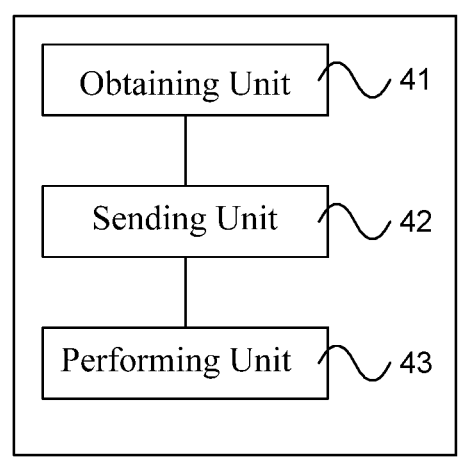
FIG. 4 is a block diagram of a network device according to another embodiment of the present disclosure.

FIG. 4 is a block diagram of a network device according to another embodiment of the present disclosure, as shown in FIG. 4. The network device of this embodiment may comprise an obtaining unit 41, a sending unit 42, and a performing unit 43. The obtaining unit 41 is configured to obtain configuration information of a zero-power uplink reference signal based on a resource occupied by the zero-power uplink reference signal; the sending unit 42 is configured to send the configuration information to a terminal; the performing unit 43 is configured to receive no uplink data on the resource; and/or, receive no non-zero-power uplink reference signal on the resource.

Optionally, in a possible implementation manner of this embodiment, the sending unit 42 may be configured to send the configuration information to a terminal through high-layer signaling or downlink control information.

Optionally, in one possible implementation manner of this embodiment, the configuration information may comprise, but is not limited to, resource configuration information and activation information, which is not limited in this embodiment; wherein the resource configuration information indicates a resource configured for the zero-power uplink reference signal;

the activation information indicates whether to activate the zero-power uplink reference signal.

Optionally, in one possible implementation manner of this embodiment, the performing unit 43 is configured to perform rate matching or puncturing processing on uplink data on the resource.

In the present disclosure, the zero-power uplink reference signal and the non-zero-power uplink reference signal are a same type of uplink reference signal, or are different types of uplink reference signal, which is not limited in this embodiment.

It should be noted that the method in the embodiments corresponding to FIG. 2 may be implemented by a network device provided in this embodiment. For detailed description, refer to related content in embodiments corresponding to FIG. 2, which will not be described herein again.

In this embodiment, by the obtaining unit obtaining configuration information of a zero-power uplink reference signal based on a resource occupied by the zero-power uplink reference signal, the configuration information is further sent to a terminal by the sending unit, so that no uplink data is received by the performing unit on the resource, and/or no non-zero-power uplink reference signal is received by the performing unit on the resource. Because the terminal performs a resource reservation, it effectively avoids that an uplink signal transmitted by the terminal on the reserved resource has interference with an uplink reference signal transmitted by other terminal on the reserved resource, so that reliable transmission of the uplink reference signal of the terminal can be ensured, thereby improving transmission performance of these uplink reference signals.

A person skilled in the art may clearly understand that for the sake of convenience and conciseness in description, corresponding processes in the forgoing method embodiments can be referenced for the specific work processes of the systems, devices and units described in the above, which are not further described herein.

In several embodiments provided by the present application, it should be understood that the disclosed systems, devices and methods may be implemented by other means. For example, the device embodiments described above are merely schematic. For example, the partitioning of the units may be a partitioning in logical functions. There may be other manners for partitioning in actual implementation. For example, multiple units or components may be combined together or integrated into another system, or some features can be omitted or not executed. In addition, mutual couplings or direct couplings or communication connections that are shown or discussed may be indirect couplings or communication connections through some interfaces, devices or units, and may be in electrical, mechanical or other forms.

The units described as separated components may be or may not be physically separated. The components shown as units may be or may not be physical units, that is, they may be located in one place or may be distributed on a plurality of network units. Part or all of the units may be selected according to actual needs to achieve the purposes of the solutions of the embodiments of the present application.

In addition, all functional units in the embodiments of the present application may be integrated into one processing unit. Or, each unit exists independently in physics. Or, two or more units may be integrated into one unit. The above integrated units can be implemented in the form of hardware or in the form of hardware plus software functional units.

At last, it should be noted that the above embodiments are only used to illustrate the technical solutions of the present disclosure, and are not limited thereto; although the present disclosure has been described in detail with reference to the foregoing embodiments, those skilled in the art should understand: they still may modify the technical solutions described in the foregoing embodiments, or substitute equivalents of the technical features; these modifications and substitutions do not substantially depart from the spirit and scope of the technical solutions of the embodiments of the present disclosure.

What is claimed is:

1. A method for transmitting an uplink signal, comprising:
receiving configuration information of a zero-power demodulation reference signal (DMRS) sent from a network device, wherein the configuration information comprises resource configuration information and activation information, the resource configuration information is used to indicate a plurality of resources configured for the zero-power DMRS, and the activation information is used to indicate:
1) whether to enable the zero-power DMRS; and
2) selecting a resource occupied by the enabled zero-power DMRS in the plurality of resources configured for the zero-power DMRS indicated by the resource configuration information;
determining the resource occupied by the zero-power DMRS based on the resource configuration information in the configuration information;
wherein the resource occupied by the zero-power DMRS is not used for sending uplink data, and the resource occupied by the zero-power DMRS is not used for sending non-zero-power DMRS.

2. The method according to claim 1, wherein the resource configuration information is carried by a radio resource control RRC message.

3. The method according to claim 1, wherein the activation information is carried by a media access control element MAC CE message or downlink control information DCI.

4. The method according to claim 1, wherein the determining the resource occupied by the zero-power DMRS based on the configuration information comprises:
determining the resource occupied by the zero-power DMRS based on the resource configuration information, when the activation information indicates to enable the zero-power DMRS.

5. The method according to claim 1, wherein the resources configured for the zero-power DMRS share the same resources with resources configured for a corresponding non-zero-power DMRS.

6. The method according to claim 1, wherein the not sending the uplink data on the resource on the resource occupied by the zero-power DMRS comprises:
performing, on the resource occupied by the zero-power DMRS, rate matching or puncturing processing on the uplink data.

7. A terminal, comprising:
a memory storing programs;
a transceiver; and
a processor configured to execute the programs;
wherein the transceiver is configured to receive configuration information of a zero-power demodulation reference signal (DMRS) sent from a network device, wherein the configuration information comprises resource configuration information and activation information, the resource configuration information is used to indicate a plurality of resources configured for the zero-power DMRS, and the activation information is used to indicate:
1) whether to enable the zero-power DMRS; and
2) selecting a resource occupied by the enabled zero-power DMRS in the plurality of resources configured for the zero-power DMRS indicated by the resource configuration information;
wherein the processor is configured to determine the resource occupied by the zero-power DMRS based on the resource configuration information in the configuration information;
wherein the resource occupied by the zero-power DMRS is not used for sending uplink data, and the resource occupied by the zero-power DMRS is not used for sending a non-zero-power DMRS.

8. The terminal according to claim 7, wherein the resource configuration information is carried by a radio resource control RRC message.

9. The terminal according to claim 7, wherein the activation information is carried by a media access control element MAC CE message or downlink control information DCI.

10. The terminal according to claim 7, wherein the processor is configured to:
determine the resource occupied by the zero-power DMRS based on the resource configuration information, when the activation information indicates to enable the zero-power DMRS.

11. The terminal according to claim 7, wherein the resources configured for the zero-power DMRS share the same resources with resource configured for a corresponding non-zero-power DMRS.

12. The terminal according to claim 7, wherein the processor is configured to:
- perform, on the resource occupied by the zero-power DMRS, rate matching or puncturing processing on the uplink data.

13. A network device, comprising:
- a memory storing programs;
- a transceiver; and
- a processor configured to execute the programs;
- wherein the transceiver is configured to send configuration information of a zero-power demodulation reference signal (DMRS) to a terminal device, wherein the configuration information comprises resource configuration information and activation information, the resource configuration information is used to indicate a plurality of resources configured for the zero-power DMRS, and the activation information is used to indicate:
  1) whether to enable the zero-power DMRS; and
  2) selecting a resource occupied by the enabled zero-power DMRS in the plurality of resources configured for the zero-power DMRS indicated by the resource configuration information.

\* \* \* \* \*